US010384702B2

(12) United States Patent
Murray et al.

(10) Patent No.: US 10,384,702 B2
(45) Date of Patent: Aug. 20, 2019

(54) RESETTING CART

(71) Applicant: Phoenix Intangibles Holding Company, Greenville, DE (US)

(72) Inventors: Daniel Christopher Murray, Massillon, OH (US); Albert Daniel Burick, Jr., New Castle, PA (US); Diana Lynn Garfold-Barr, Seattle, WA (US); Lee A. Wintermantel, Moon Township, PA (US); Anthony V. Sainato, Westlake, OH (US); James W. Bates, Cambridge, OH (US)

(73) Assignee: Phoenix Intangibles Holding Company, Greenville, DE (US)

( * ) Notice: Subject to any disclaimer, the term of this patent is extended or adjusted under 35 U.S.C. 154(b) by 0 days.

(21) Appl. No.: 15/907,321

(22) Filed: Feb. 28, 2018

(65) Prior Publication Data
US 2018/0244293 A1 Aug. 30, 2018

Related U.S. Application Data

(63) Continuation-in-part of application No. 62/464,501, filed on Feb. 28, 2017.

(51) Int. Cl.
| | |
|---|---|
| B62B 3/02 | (2006.01) |
| A47F 13/00 | (2006.01) |
| A47F 5/10 | (2006.01) |
| A47F 5/00 | (2006.01) |
| A47F 5/08 | (2006.01) |
| A47F 3/06 | (2006.01) |

(52) U.S. Cl.
CPC .............. *B62B 3/02* (2013.01); *A47F 5/0006* (2013.01); *A47F 5/0823* (2013.01); *A47F 5/103* (2013.01); *A47F 5/108* (2013.01); *A47F 13/00* (2013.01); *A47F 2003/066* (2013.01); *B62B 2301/04* (2013.01)

(58) Field of Classification Search
CPC ......... B62B 3/02; B62B 3/002; A47F 5/0823; A47F 5/103; A47F 5/108
See application file for complete search history.

(56) References Cited

U.S. PATENT DOCUMENTS

| | | | | |
|---|---|---|---|---|
| 4,037,851 A * | 7/1977 | Romero | ..................... | A47F 5/13 280/79.3 |
| 6,264,220 B1 * | 7/2001 | Pierce | ...................... | B25H 3/04 280/47.35 |
| 6,899,347 B2 * | 5/2005 | Neal | ......................... | B62B 1/10 108/36 |
| 7,213,816 B2 * | 5/2007 | Gregory | .................. | B62B 3/106 280/33.996 |
| 7,815,202 B2 * | 10/2010 | Richards | ................. | A47F 5/135 211/126.8 |
| 8,474,835 B1 * | 7/2013 | Rossi | ....................... | B62B 3/02 280/47.35 |

(Continued)

*Primary Examiner* — Brian L Swenson
(74) *Attorney, Agent, or Firm* — Eckert Seamans Cherin & Mellott, LLC; David C. Jenkins

(57) ABSTRACT

A resetting cart with a number of product support assemblies is provided. The product support assemblies are movably coupled to a cart assembly and structured to move between a number of vertical positions. Thus, a number of reset assembly shelf assemblies are disposed at a selected elevation that generally corresponds to a product support assembly (e.g., a shelf) elevation.

20 Claims, 9 Drawing Sheets

(56) References Cited

U.S. PATENT DOCUMENTS

| | | | | |
|---|---|---|---|---|
| 8,777,024 B2* | 7/2014 | Kramer | ................ | A47F 5/0025 |
| | | | | 211/187 |
| 9,668,592 B1* | 6/2017 | Lindblom | ............. | A47F 5/0087 |
| 9,936,825 B1* | 4/2018 | Lindblom | ............. | A47F 5/0087 |
| 10,037,659 B2* | 7/2018 | Wise | ................... | G07G 1/0018 |
| 2005/0067360 A1* | 3/2005 | Darvial | ................ | B65D 85/48 |
| | | | | 211/41.14 |
| 2008/0007019 A1* | 1/2008 | Sparkowski | ............ | A47F 5/137 |
| | | | | 280/79.3 |
| 2013/0240472 A1* | 9/2013 | Preidt | ...................... | A47F 5/00 |
| | | | | 211/153 |
| 2013/0269284 A1* | 10/2013 | Hovenier | ................. | B66F 9/18 |
| | | | | 52/745.11 |
| 2018/0116393 A1* | 5/2018 | Gonzalez | ............... | A47B 31/04 |

* cited by examiner

RESETTING CART

CROSS REFERENCE TO RELATED APPLICATION

This application is a continuation-in-part application claims priority to U.S. provisional Patent Application Ser. No. 62/464,501, filed Feb. 28, 2017, entitled RESETTING CART.

BACKGROUND OF THE INVENTION

Field of the Invention

The disclosed and claimed concept relates to a cart for resetting product supports (such as shelves) and, more particularly, to a cart for resetting product supports wherein a number of product support assemblies on the cart are generally at the same elevation as the product supports.

Background Information

Many products that are offered for sale are generally displayed on a product support. That is, a product support is commonly a shelf but may also be a cantilevered rod or set of rods (hereinafter and collectively a "peg"). Further, supplies that are similar to such products are also stored on shelves, pegs, and similar constructs. It is understood that the following discussion of a "resetting cart" provides a store as an example. The "resetting cart" is not limited to use in a commercial space but may also be used in other environments.

The following discussion will use food products stored on shelves as an example. Generally, food in a grocery is displayed in an organized manner. That is, similar products are displayed on a shelf adjacent to similar products. For example, one shelf may include several different types and/or brands of spaghetti sauce. Over time, customers remove product units from the shelf and the shelves must be restocked. "Restocking" is different from "resetting" a shelf.

"Resetting," as used herein, means that all of the product units, or possibly all of the product units of a specific type, are removed/relocated to another location in the store and/or replaced in a different location on the shelf. This occurs, for example, when a store reorganizes. That is, all the spaghetti sauces are moved from aisle 1A to aisle 12B. Alternatively, a specific style of a product, e.g., a pumpkin spice flavored product, may be discontinued and all units of that particular style of a product are removed. Thus, as opposed to replacing a small number of product units, as during restocking, resetting a display is more labor intensive.

Presently, many stores use general-purpose carts for both restocking and resetting. That is, for example, a grocery store will use a number of grocery carts for a resetting operation. Assuming that a product is to be moved to a different aisle, the following generally occurs. A reset person typically removes all the product units from the first location and places all the product units into a number of grocery carts. Typically, this is not performed in an organized manner. That is, for example, a number of regular spaghetti sauce jars, a number of basil/garlic spaghetti sauce jars, and a number of tomato/vodka sauce jars are placed in the same grocery cart. The reset person is not likely to use a single grocery cart for each product type when there is a large variety of product types because the store would not want the aisles to be blocked with a train of grocery carts. Thus, when the reset person arrives at the new location, the reset person must sort the products as the units are placed on the shelf. Further, because storage space on a common grocery cart is at or below waist level, the reset person must bend and lift the product units. This motion is exacerbated if the product units are being placed on a lower shelf. That is, the reset person must identify the item to be moved, bend to take the item from the grocery cart, straighten up to remove the item from the grocery cart, bend down again to place the item on the shelf, then stand to repeat the process. These actions are time consuming and excessive repetition may cause injury to the reset person. This is a problem.

Further, a grocery cart typically is about as wide as half of an aisle. Thus, use of a grocery cart may block the aisle. Also, a store has a limited number of grocery carts, so use by a reset person means that a customer may not have a grocery cart. Similar problems arise when the resetting operation requires "editing" the product units. As used herein, "editing" means selectively removing a subset of product units from a larger set of similar product units. Product units may be edited for being past an expiration date or, as noted above, because a specific style of a product is discontinued, as well as other reasons. If a single grocery cart is used, the reset person will mix the "edited" product units with the items being re-shelved, thus requiring more sorting time, or, if the edited items are placed in a separate grocery cart, the reset person is using two grocery carts which blocks aisles and prevents customers from using the grocery carts.

There is, therefore, a need for a resetting cart that addresses the problems identified above.

SUMMARY OF THE INVENTION

These needs, and others, are met by at least one embodiment of the disclosed and claimed concept which provides a resetting cart with a number of product support assemblies. The product support assemblies are movably coupled to a cart assembly and structured to move between a number of vertical positions. Thus, a number of reset assembly shelf assemblies are disposed at a selected elevation that generally corresponds to a product support member (e.g., a shelf) elevation. This allows the reset person to move product units generally horizontally from the cart to the shelf. That is, the range of motion required by the reset person is reduced. This, as well as the configuration of the resetting cart, as described below, solves the problems stated above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
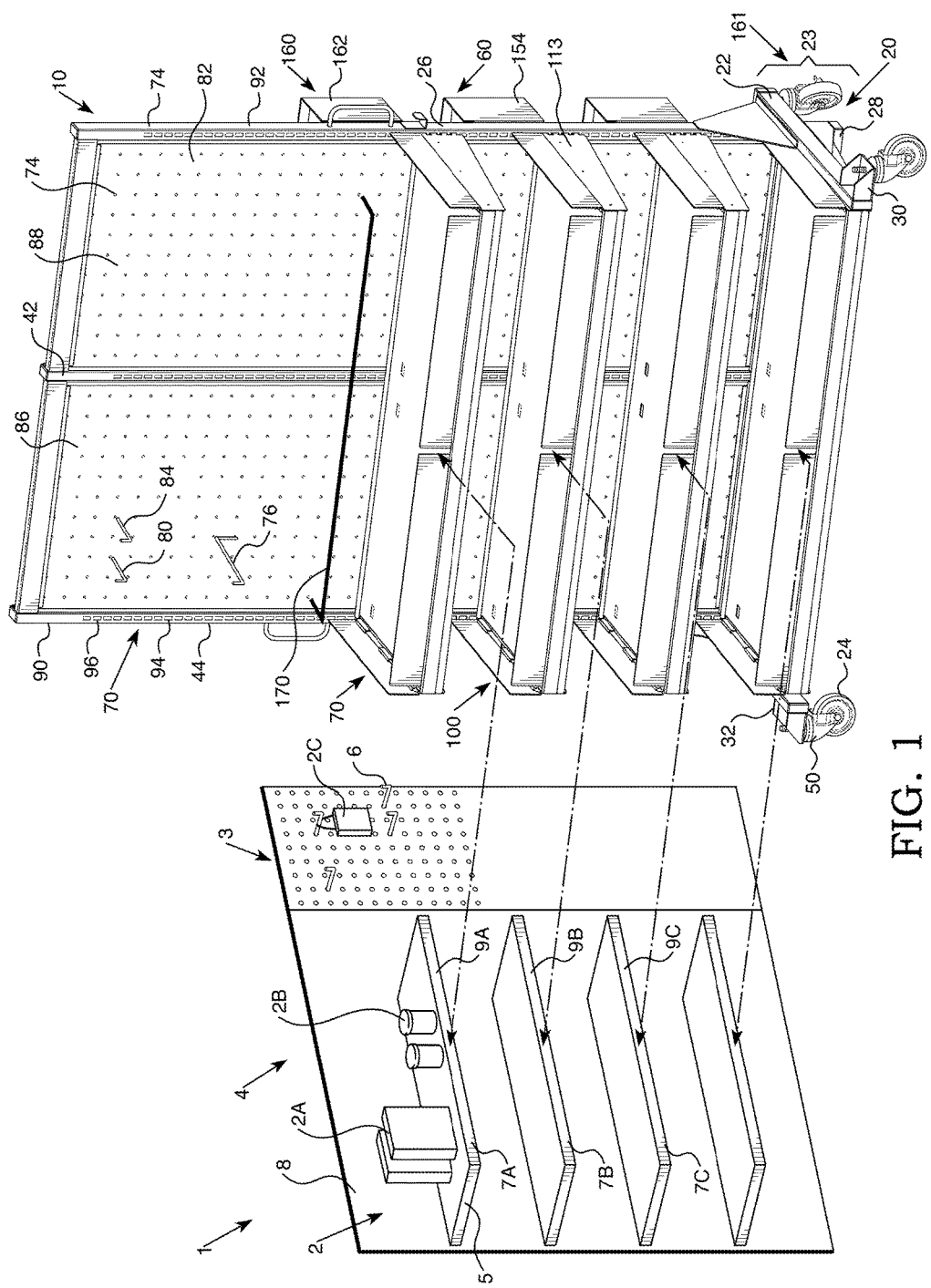
FIG. 1 is an isometric view of a product display and a resetting cart.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "movably coupled" means that a first element (or assembly) is coupled to a second element (or assembly) but is movable relative thereto. The first element, for example, may pivot or rotate relative to the second element. Further, elements that are intended to be decoupled and recoupled are "movably coupled" to each other.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, if one coupling component is a snap socket, the other coupling component is a snap plug, or, if one coupling component is a bolt, then the other coupling component is a nut or similar construct.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller, whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately" relevant to the term being modified as would be understood by one of ordinary skill in the art.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As discussed above, and as shown in FIG. 1, a resetting cart 10, described below, is used in many environments. The following discussion will use a grocery store product display 1 as an example. As is known, various products 2, including, but not limited to, boxes 2A, jars 2B, and hanging packages 2C (collectively "product units" 2A, 2B, 2C) are displayed on a product display 1. That is, in an exemplary embodiment, the product display 1 includes a peg board portion 3 and a shelf portion 4. The peg board portion 3 includes a board having a number of holes (neither numbered) disposed in a pattern. The peg board portion holes are accessible from both front and back sides, or, there is a second peg board (not shown) on the back side of the resetting cart 10. As is known, one form of a product support 5 is an elongated rod 6 (hereinafter a "peg" 6) that is coupled to the peg board portion 3. The peg 6 extends generally horizontally from the peg board portion 3. A hanging package 2C, e.g., a package with a hook at the top, is disposed on the peg 6. The shelf portion 4 includes a number of shelf members 7A, 7B, 7C (three shown) on which boxes 2A and jars 2B, as well as other products (not shown), are displayed. Each shelf member 7A, 7B, 7C includes a generally planar member 8 disposed in a generally horizontal orientation. That is, the orientation of the plane defined by the planar members 8 are each generally horizontal. The shelf members 7A, 7B, 7C are spaced vertically and, as such, each shelf member 7A, 7B, 7C is disposed at a different elevation. Further, each shelf member 7A, 7B, 7C is coupled, directly coupled, or fixed to a vertical support which, as shown, is a back wall 11, i.e., a planar member disposed in a generally vertical orientation. The shelf members 7A, 7B, 7C extend from the back wall and, as such, each shelf member 7A, 7B, 7C has a proximal end (not numbered) that is coupled, directly coupled, or fixed to the back wall (not numbered) and a distal end 9A, 9B, 9C. The shelf distal ends 9A, 9B, 9C may also be identified hereinafter as the "face" of the shelf member 7A, 7B, 7C. It is understood that the product display 1 includes, or may include, other elements, such as, but not limited to, braces, frame elements, cooling units, heating units, display cards for prices and UPC codes, etc. (none shown).

Further, as used herein, each shelf member 7A, 7B, 7C has a "shelf length." The "shelf length" is the shelf space used to display a particular brand of product or type of product. For example, while chip-like snack foods may occupy an entire aisle, brand "X" chips typically occupy a limited length of the entire shelf, i.e., a "shelf length." Similarly, while baking mixes may occupy an entire aisle, several brands of devil's food cake mix typically occupy a limited length of the entire shelf; thus, the devil's food cake mix section of an aisle occupies a "shelf length." The "shelf length" varies depending upon a store's selected layout or design. Generally, the "shelf length" is between about three to about five feet. It is understood that a shelf member 7A, 7B, 7C may extend the entire length of an aisle, as used hereinafter an "aisle length," which may be many times greater than the "shelf length."

Figure 2:
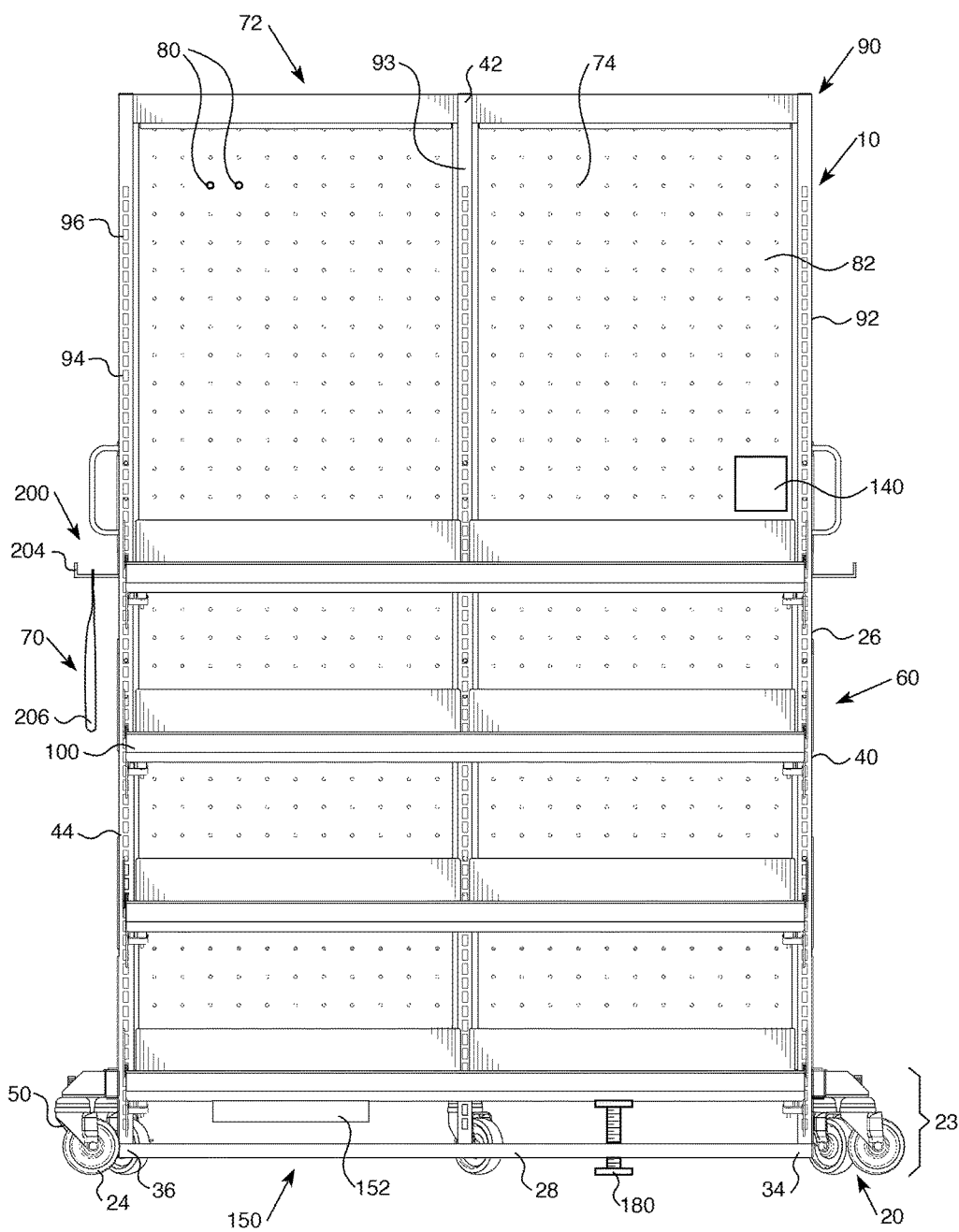
FIG. 2 is a front view of a resetting cart.

As shown in FIGS. 1 and 2, a resetting cart 10 includes a cart assembly 20 and a reset assembly 60. The cart assembly includes a frame assembly 22 and plurality of wheels 24. In an exemplary embodiment, the frame assembly 22 includes an elongated base portion 23 and a generally vertical portion 26. In one embodiment, the frame assembly base portion 23 includes a longitudinal frame member 28, which extends generally parallel to the longitudinal axis of the frame assembly base portion 23, a first lateral member 30 and a second lateral member 32, which extend generally perpendicular to the longitudinal axis of the frame assembly base portion 23. The longitudinal frame member 28 includes a first end 34 and a second end 36. The first lateral member 30 is coupled to the longitudinal frame member first end 34. The second lateral member 32 is coupled to the longitudinal frame member second end 36. In one embodiment, the longitudinal frame member 28 is offset relative to the middle of the two lateral members 30, 32. That is, the longitudinal frame member 28 is coupled to the two lateral members 30, 32 at a location other than at the middle of the two lateral members 30, 32. In another embodiment (not shown), the longitudinal frame member 28 is coupled to the two lateral members 30, 32 generally near the middle of each lateral member 30, 32.

Figure 6:
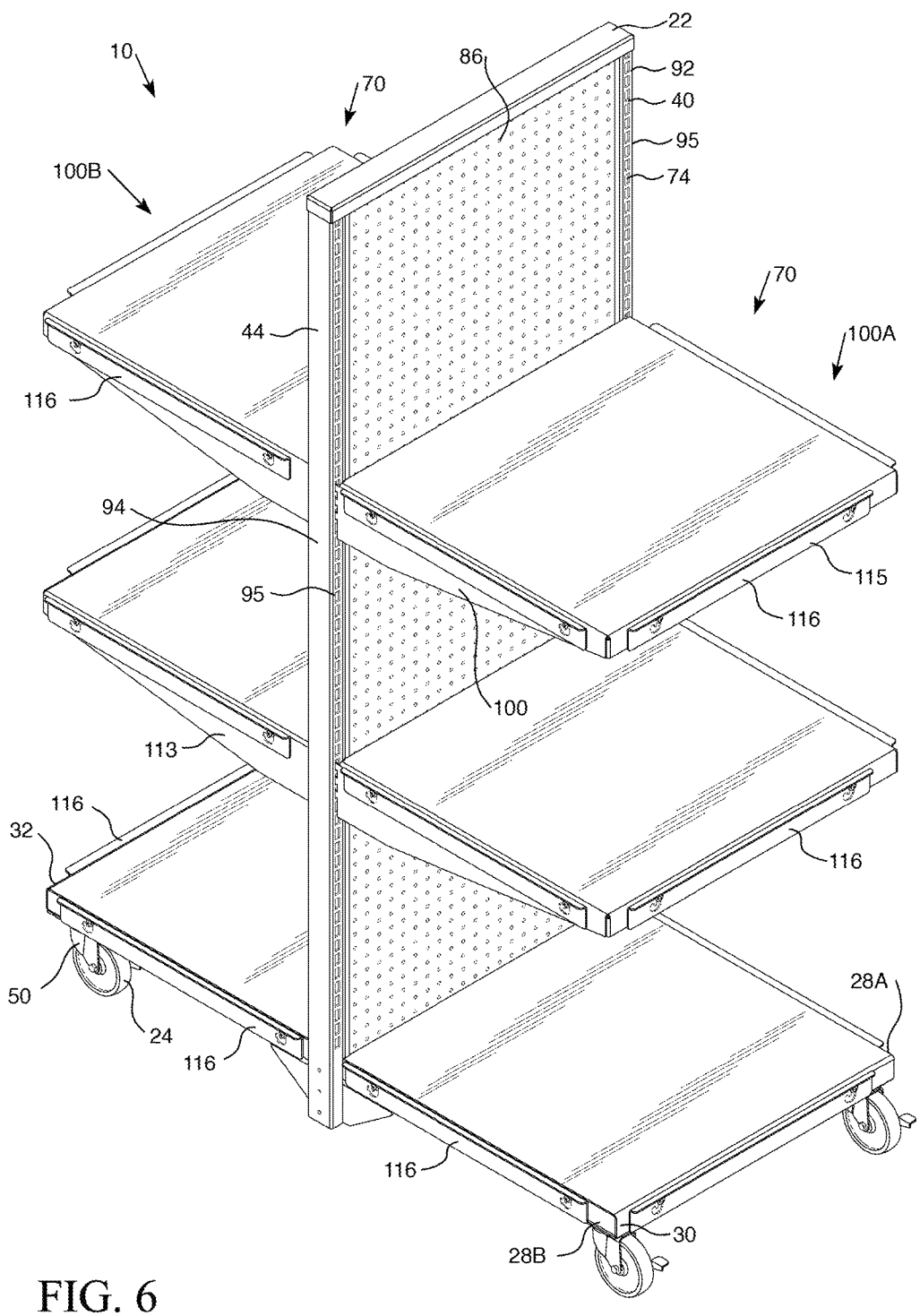
FIG. 6 is an isometric view of an alternate embodiment of the resetting cart.
Figure 7:
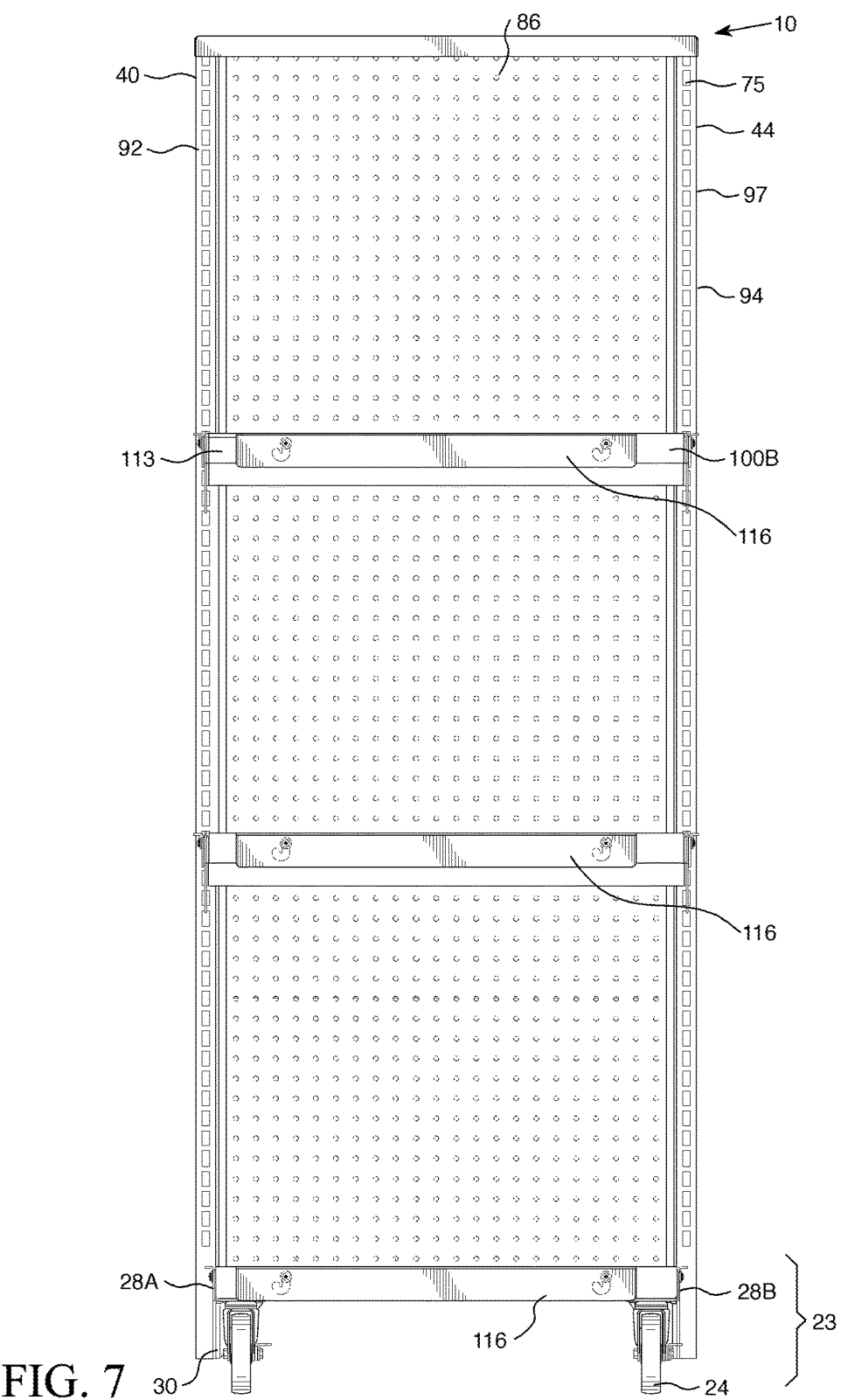
FIG. 7 is a back view of the resetting cart in FIG. 6.
Figure 8:
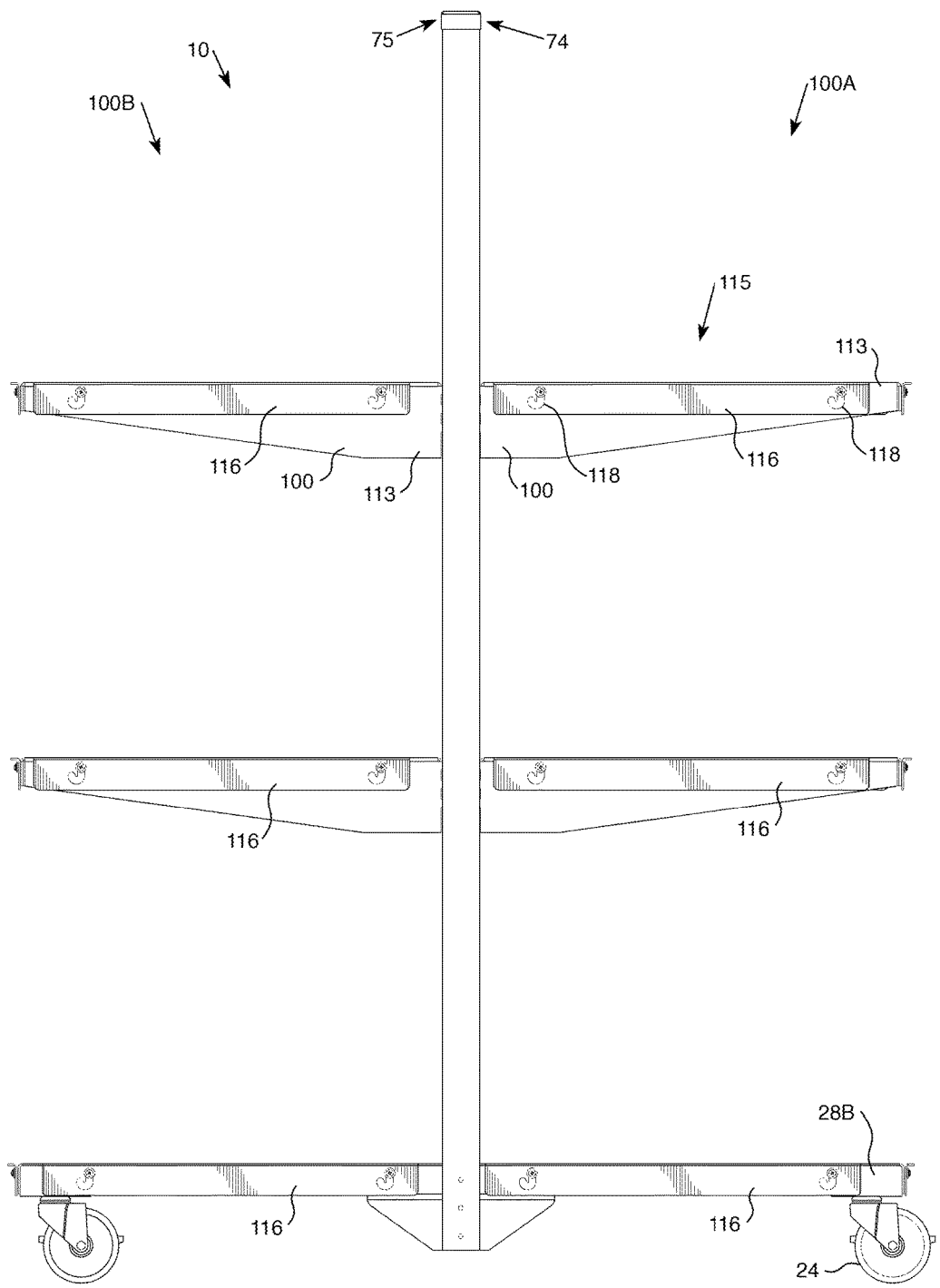
FIG. 8 is a side view of the resetting cart in FIG. 6.
Figure 9:
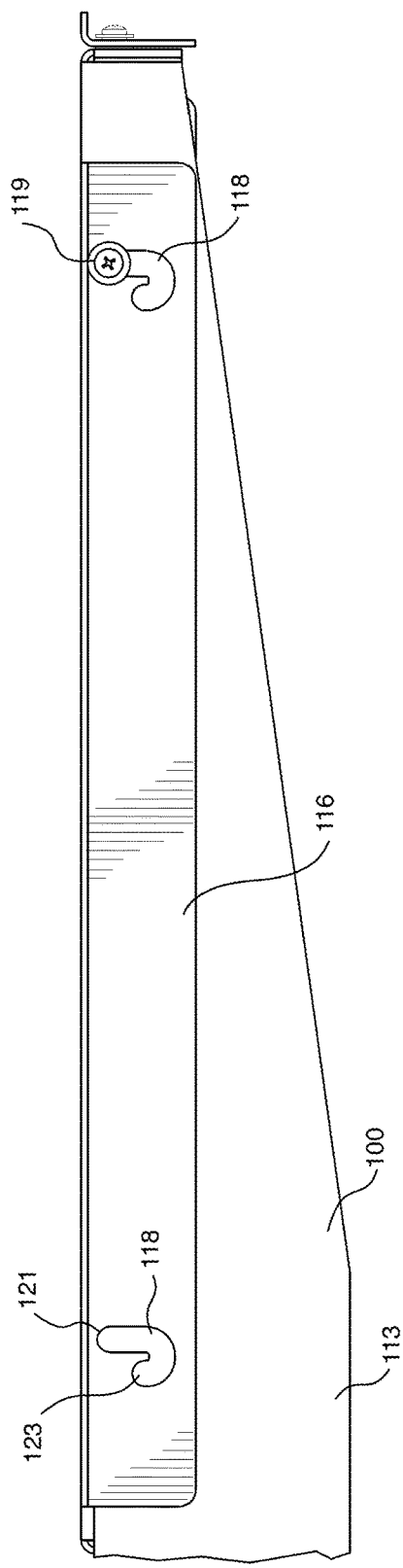
FIG. 9 is a detail view of a retention assembly.

In another embodiment, shown in FIGS. 6-8, the frame assembly base portion 23 includes two longitudinal frame members 28A, 28B which extends generally parallel to the longitudinal axis of the frame assembly base portion 23. In this embodiment, the first lateral member 30 and the second lateral member 32, also extend generally perpendicular to the longitudinal axis of the frame assembly base portion 23 but further extend between two longitudinal frame members 28A, 28B. That is, the first lateral member 30 and the second lateral member 32 are structured to be, and are, coupled, directly coupled, or fixed to both longitudinal frame members 28A, 28B. Further, in an exemplary embodiment, the two longitudinal frame members 28A, 28B, the first lateral member 30, and the second lateral member 32 are also part of a movable product support shelf assembly 100, discussed below.

In an exemplary embodiment, the frame assembly vertical portion 26 includes a first vertical member 40, a medial vertical member 42, and second vertical member 44. The first vertical member 40 is coupled, directly coupled, or fixed to the longitudinal frame member first end 34 and extends generally vertically therefrom. The medial vertical member 42 is coupled, directly coupled, or fixed to the longitudinal frame member 28 at about the middle thereof and extends generally vertically therefrom. The second vertical member 44 is coupled, directly coupled, or fixed to the longitudinal frame member second end 36 and extends generally vertically therefrom.

The wheels 24 are pivotally coupled to the frame assembly base portion 23. That is, in an exemplary embodiment, each wheel 24 has a bracket 50 that is rotatably coupled to the frame assembly base portion 23. Further, each wheel 24 is structured to, and does, rotate about an axle (not shown). Each bracket 50 is structured to, and does, rotate about a generally vertical axis. In an exemplary embodiment, the wheels 24 are disposed at each end of the two lateral members 30, 32 as well as below the medial vertical member 42.

Further, the wheels 24, in an exemplary embodiment, include a locking assembly (not shown) that is structured to, and does, lock the wheels relative to the frame assembly base portion 23 so that the wheels 24 cannot rotate about their axles.

The reset assembly 60 is structured to support a number of product units 2A, 2B, 2C and to position the product units 2A, 2B, 2C at an elevation corresponding to a peg 6 or a shelf member 7A, 7B, 7C. As used herein, to "position . . . at an elevation corresponding" means that the element being positioned is selectively disposed at the desired elevation. That is, for example, a cart with fixed shelves that have an elevation that happens to generally correspond to the elevation of a product display shelf does not "position [a product on the cart] at an elevation corresponding" to the product display shelf. Stated alternately, to "position . . . at an elevation corresponding" means that the reset assembly 60 must include movable product support assemblies 70, discussed below.

The reset assembly 60 includes a number of product support assemblies 70 and a number of mounting assemblies 72. Each product support assembly 70 is movably coupled to the cart assembly 20 and is structured to move between a number of vertical positions. That is, each product support assembly 70 is structured to be, and is, moved to a vertical position generally corresponding to the elevation of a peg 6 or a shelf member 7A, 7B, 7C. As used herein, "generally corresponding to the elevation" means that a first element (or assembly) is disposed generally horizontally relative to another element (or assembly). In an exemplary embodiment, each product support assembly 70 is temporarily coupled to a mounting assembly 72. That is, the mounting assembly 72 includes a number of temporary coupling first components 74 and each product support assembly 70 includes a number of temporary coupling second components 76. When the first and second temporary coupling second components 74, 76 are coupled, a product support assembly 70 is temporarily coupled to the mounting assembly 72.

In an exemplary embodiment, the reset assembly 60 is structured to reset product units 2A, 2B, 2C on both pegs 6 and shelf members 7A, 7B, 7C. Thus, in this embodiment, the reset assembly 60 includes two types of product support assemblies 70, each removably (or temporarily) coupled to a mounting assembly 72. One type of product support assembly 70 is a peg member 80 and the associated mounting assembly 72 is a peg board 82. That is, a peg member 80 is one embodiment of a product support assembly 70 and a peg board 82 is one embodiment of a mounting assembly 72. A peg member 80 is an elongated rod 84 including a hook (not shown) or similar construct at one end. The peg member hook is one embodiment of a temporary coupling second component 76. The peg member rod 84 may include notches, ridges/valleys, or other constructs (none shown) upon which a hanging package 2C may be disposed. The end of the peg member rod 84 opposite the hook may be upturned so as to generally prevent a hanging package 2C from sliding off the peg member rod 84.

The peg board 82 is a generally planar member 86 including a number of holes 88 disposed in a grid-like pattern. As shown, the peg board 82 is coupled, directly coupled, or fixed between the frame assembly vertical portion first vertical member 40 and the frame assembly vertical portion second vertical member 44. Thus, the plane of the peg board 82 is generally vertical. In this configuration, the peg board holes 88 are disposed at multiple elevations. The peg board holes 88 are one embodiment of a temporary coupling first component 74.

Each peg member rod 84 is temporarily coupled to the peg board 82 at an elevation generally corresponding to the elevation of the product display peg 6 that is to be reset. That is, when a product display 1 with hanging packages 2C is to be reset, a user observes the product display 1 and the location of the various pegs 6. The user then positions a number of peg members 80 at an elevation, or elevations, corresponding to the product display peg(s) 6. The user then disposes the reset hanging packages 2C on the peg members 80 at an elevation corresponding to the reset location of the reset hanging packages 2C. As used herein, a "reset package" (or "reset box" or "reset jar") is the product unit 2A, 2B, 2C that is to be on the product display 1 after the reset operation is complete. Similarly, the "reset location" is the location of the reset package after the reset operation is complete. The reset operation is described in more detail below.

Another embodiment of a product support assembly 70 and a mounting assembly 72 is a number of movable product support shelf assemblies 100 (discussed below) that is structured to be, and is, removably coupled to a rack assembly 90. That is, in this embodiment, the product support assembly 70 is the number of movable product support shelf assembly 100, and, the mounting assembly 72 is the rack assembly 90. The rack assembly 90 includes a number of spaced racks 92, 94. The rack assembly 90, and therefore each rack 92, 94, has a first side 95 and an opposed second side 97. Each rack 92, 94 is an elongated element including a number of first side first coupling components 74 and a number of second side first coupling components 75. In an exemplary embodiment, the first side first coupling components 74 and the number of second side first coupling components 75 are a number of slots 96. Further, in an exemplary embodiment, each rack 92, 94 is unitary with the frame assembly 22 and, as shown, unitary with one of the frame assembly vertical portion first vertical member 40 or the frame assembly vertical portion second vertical member 44. That is, the first side first coupling components 74, and if included, the second side first coupling components 75, are defined by the frame assembly 22. In one embodiment, there is only one set of product support shelf assemblies 100 extending to one lateral side of the longitudinal frame member 28. Stated alternately, the set of product support shelf assemblies 100 extends from a location adjacent one face of peg board 82.

In another exemplary embodiment, shown in FIGS. 6-9, there are two sets of product support shelf assemblies 100 extending to both lateral sides of the longitudinal frame member 28. Stated alternately, one set of product support shelf assemblies 100 extend from a location adjacent one face of peg board 82, and, another set of product support shelf assemblies 100 extend from a location adjacent the other face of peg board 82. Thus, in this embodiment, there is a set of first side product support shelf assemblies 100A and a set of second side product support shelf assemblies 100B. The first side product support shelf assemblies 100A are structured to be, and are, removably coupled to the rack assembly first side first coupling components 74, and, the second side product support shelf assemblies 100B are structured to be, and are, removably coupled to the rack assembly second side first coupling components 75. In an exemplary embodiment, the first side product support shelf assemblies 100A and the second side product support shelf assemblies 100B are disposed in a generally mirrored pattern. That is, for each first side product support shelf assembly 100A disposed at a selected elevation on the first side 95 of racks 92, 94 there is a second side product support shelf assembly 100B disposed at, or about at, the same elevation on the second side 97 of racks 92, 94.

Thus, the product support shelf assemblies 100 are structured to be, and are, temporarily coupled to the rack assembly 90 in one of a one-sided configuration, wherein each product support shelf assembly 100 extends from one side 95, 97 of the rack assembly 90, or, a two sided configuration, wherein the product support shelf assemblies 100 extend from both sides 95, 97 of the rack assembly 90. Further, a "mirrored configuration," as used herein means the product support shelf assemblies 100 are in a configuration wherein for each first side product support shelf assembly 100A disposed at a selected elevation on the first side 95 of racks 92, 94 there is a second side product support shelf assembly 100B disposed at, or about at, the same elevation on the second side 97 of racks 92, 94. Thus, the product support shelf assemblies 100 are structured to be, and are, in one of a one-sided configuration, a two-sided configuration, or a mirrored configuration. Further, in an exemplary embodiment, the product support shelf assemblies 100 are structured to be, and are disposed at a selected elevation that generally corresponds to a shelf member 7A, 7B, 7C elevation.

Further, in an exemplary embodiment, the rack assembly 90 includes a center rack 93 disposed about halfway between spaced racks 92, 94. While the center rack 93 can be used with any embodiment of the product support shelf assemblies 100, in an exemplary embodiment, the center rack 93 is used in an embodiment wherein the product support shelf assemblies 100 are about half the width of the spaced racks 92, 94. That is, in this embodiment, two product support shelf assemblies 100 are coupled to the racks 92, 93, 94 at a selected elevation. In this embodiment, the center rack 93 includes slots 96 that are structured to accommodate two product support shelf assemblies 100. That is, the slots 96 are structured to be coupled to at least two product support shelf assembly hooks 126, described below. For example, the slots 96 in the center rack 93 have a width that is at least twice as wide as two product support shelf assembly hooks 126.

Figure 3:
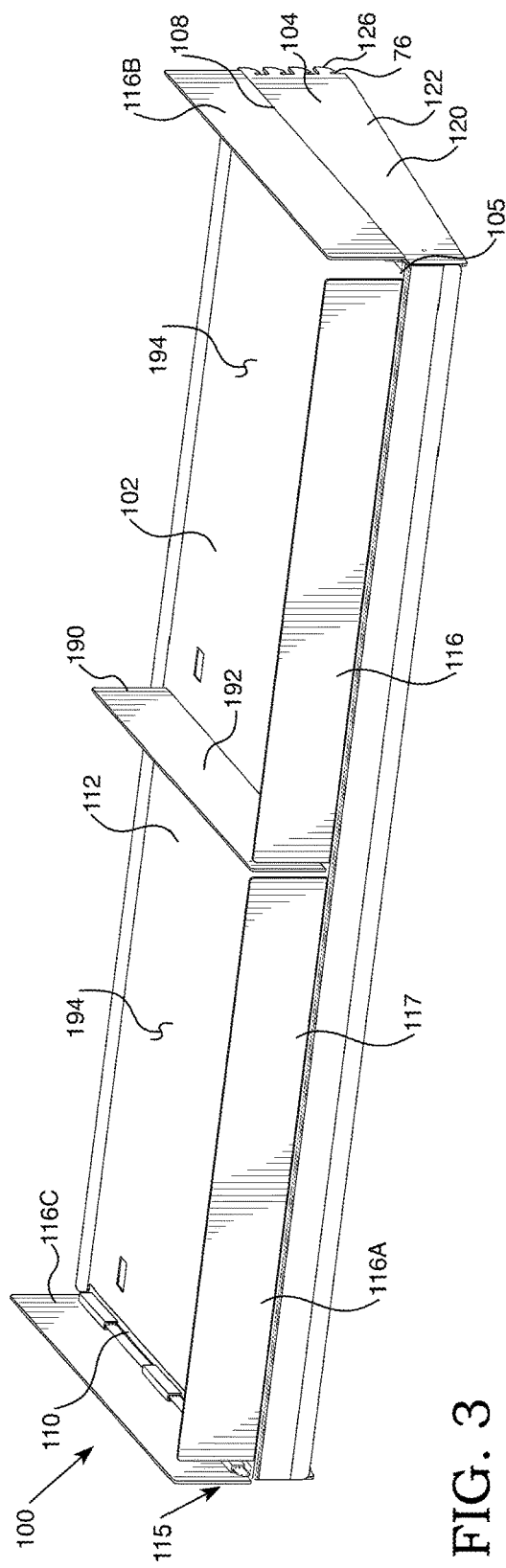
FIG. 3 is an isometric view of a product support shelf assembly.
Figure 4:
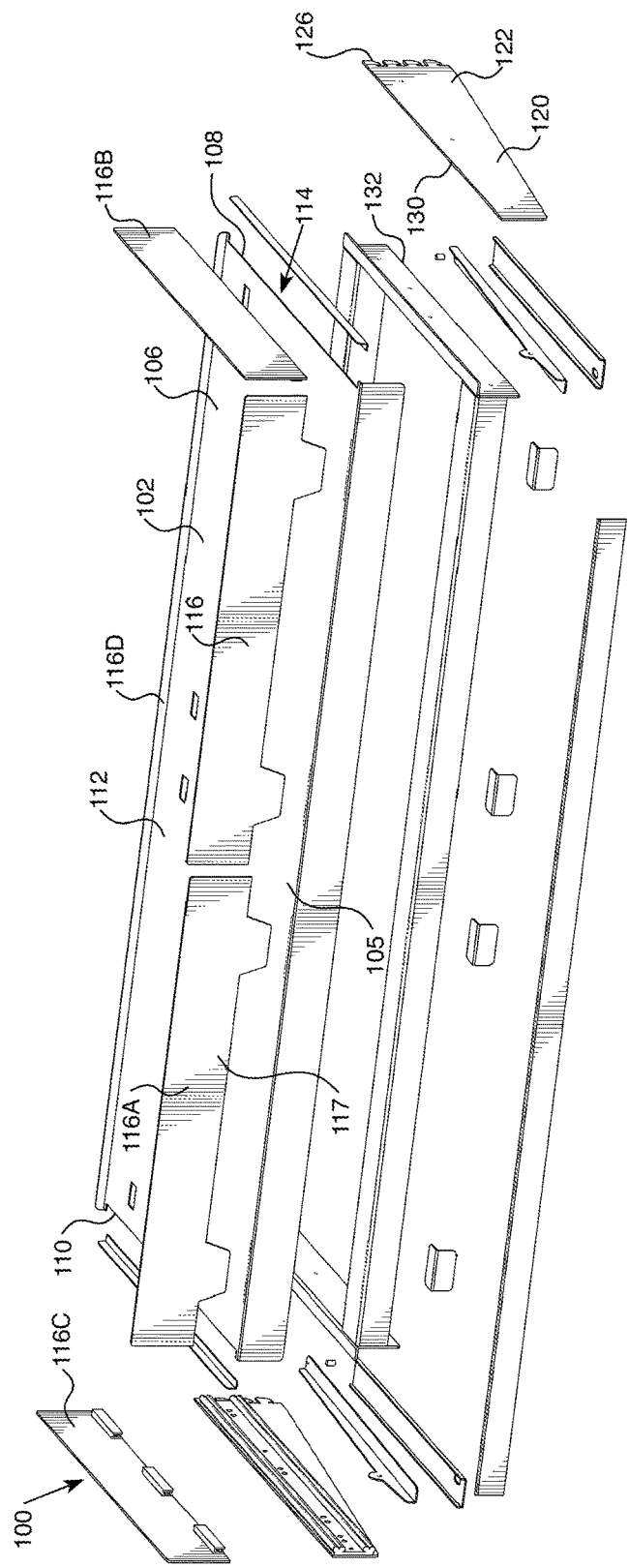
FIG. 4 is an exploded isometric view of a product support shelf assembly.

As shown in FIGS. 3 and 4, each product support shelf assembly 100 includes a generally planar member 102 (hereinafter "product support shelf member" 102) and a number of supports 104. Each product support shelf member 102 is, in an exemplary embodiment, generally rectangular and is disposed in a generally horizontal plane. A rectangular product support shelf member 102 includes a front side 105, a back side 106, a first lateral side 108, a second lateral side 110, an upper surface 112, and a lower surface 114. Further, each of the front side 105, back side 106, first lateral side 108, and the second lateral side 110 have a generally vertical surface 113. The product support shelf member front side 105 and the product support shelf member back side 106 are the longer, thin sides of the product support shelf member 102. The product support shelf member first lateral side 108 and the second lateral side 110 are the shorter, thin sides of the product support shelf member 102. Each product support shelf member 102 is, in one embodiment, a "shelf length" product support shelf member 102. As used herein, a "shelf length" product support shelf member 102 has a length generally corresponding to the "shelf length" shelf member 7A, 7B, 7C. In an alternate embodiment, each product support shelf member 102 is a "partial length" product support shelf member 102. As used herein, a "partial length" product support shelf member 102 has a length that is generally less than the length of a "shelf length" shelf member 7A, 7B, 7C. In one exemplary embodiment, the partial length product support shelf member 102 has a length that is about 50% of the length of a shelf length. For example, in one embodiment each shelf member 7A, 7B, 7C has a length of about four feet. Thus, a "shelf length" product support shelf member 102 also has a length of about four feet. Further, two "partial length" product support shelf members 102 each has a length of about two feet.

Further, a product support shelf member upper surface 112 has a selected coefficient of friction. That is, in one embodiment, the product support shelf member upper surface 112 has a relatively low (when compared to generally smooth wood) coefficient of friction so as to allow product units 2A, 2B, 2C to move thereon. In an exemplary embodiment, the product support shelf member upper surface 112 is a silicone material or coating. Alternatively, in another exemplary embodiment, the product support shelf member upper surface 112 has a relatively high (when compared to generally smooth wood) coefficient of friction so as to resist the movement of product units 2A, 2B, 2C thereon. In an exemplary embodiment, the product support shelf member upper surface 112 is a grit-infused surface. In another alternative, the product support shelf member upper surface 112 has a roller surface (not shown). As used herein, a "roller surface" includes a number of rolling members, such as but not limited to, trapped ball bearings, or, trapped cylindrical bearings having parallel axes of rotation (which are generally parallel to the longitudinal axis of the product support shelf member 102).

In an exemplary embodiment, each product support shelf assembly 100 also includes a product retention assembly 115. The product retention assembly 115 is structured to, and does, substantially maintain product units 2A, 2B, 2C on the product support shelf member upper surface 112. The product retention assembly 115 includes a number barrier members 116. Each barrier member 116 is an upwardly depending, generally planar member 117. As used herein "upwardly depending" means an element that extends upwardly and generally vertically from another element. In an exemplary embodiment, the barrier members 116 extend from the perimeter of the product support shelf member 102. That is, as used herein, "extend from the perimeter of the product support shelf member" means that at least one barrier member 116 extends from each side of the product support shelf member 102. Further, and as shown, the barrier members 116 include front side barrier member(s) 116A disposed on the product support shelf member front side 105, a first lateral side barrier member 116B disposed at the product support shelf member first lateral side 108, and a second lateral side barrier member 116C disposed at product support shelf member second lateral side 110. Further, these side barrier member(s) 116A, 116B, 116C are removably coupled to the product support shelf member 102. Further, in this embodiment, the back side barrier member 116D disposed at the product support shelf member back side 106 is a ledge that is unitary with the product support shelf member 102. As shown, the back side barrier member 116D is not as tall as the front and lateral side barrier member(s) 116A, 116B, 116C. In another embodiment, not shown, the back side barrier member 116D is substantially similar to the front and lateral side barrier member(s) 116A, 116B, 116C. That is, the back side barrier member 116D is removably coupled to the product support shelf member 102 and has a greater height.

Further, in an exemplary embodiment, the front and lateral side barrier member(s) 116A, 16B, 116C are movably, and as shown slidably, coupled to the associated product support shelf member 102. In this configuration, the front and lateral side barrier member(s) 116A, 116B, 116C are structured to move between two positions. That is, the front and lateral side barrier member(s) 116A, 116B. 116C move between a lower, first position, wherein the top of the front and lateral side barrier member(s) 116A, 116B, 116C is at an elevation below the upper surface of the associated product support shelf member 102, and, an upper, second position wherein the front and lateral side barrier member(s) 116A, 116B, 116C extends above the elevation of the upper surface of the associated product support shelf member 102. In this configuration, the front and lateral side barrier member(s) 116A, 116B, 116C are structured to be in the first position when moving product on to, or off of, the associated product support shelf member 102. Further, the front and lateral side barrier member(s) 116A, 116B, 116C are moved to the second position when moving the reset assembly 60. In the second position, the front and lateral side barrier member(s) 116A, 116B, 116C maintain products on the associated product support shelf member 102.

In one embodiment, as shown in FIG. 10, the product retention assembly 115 includes a number of movable barrier members 116 having a plurality of J-shaped slots 118 therein and a number of capped pins 119. The J-shaped slots 118 are a first coupling component that are structured to, and do, correspond to generally horizontal capped pins 119 that extend from the vertical surfaces 113 of the product support shelf member 102. The J-shaped slots 118 have a first end 121 at a first elevation, and, a second end 123 at a second elevation. As shown, the first elevation is higher than the second elevation. The barrier members 116 are movably coupled to the product support shelf member 102 when the capped pins 119 extend through the J-shaped slots 118. That is, the capped pins 119 extend generally horizontally from an associated product support shelf assembly 100 and extend through a J-shaped slot 118. It is understood that, in an exemplary embodiment, each J-shaped slot 118 has a single capped pin 119 extending therethrough.

In this configuration, the barrier members 116 are structured to, and do, move between a lower, first position, wherein the capped pins 119 are disposed immediately adjacent, or in contact with, the J-shaped slot first end 121, and, an upper, second position, wherein the capped pins 119 are disposed immediately adjacent, or in contact with, the J-shaped slot second end 123. That is, generally, the barrier members 116 are structured to be, and are, moved between a lowered position or raised position.

In another embodiment, the front side barrier members 116A are coupled to the product support shelf member 102 by a hinge assembly (not shown). That is, the front side barrier members 116A are pivotally coupled to the product support shelf member front side 105. In this configuration, the front side barrier members 116A are structured to, and do, move between an upright, first position and a generally horizontal, second position. In an exemplary embodiment, when the front side barrier members 116A are in the horizontal, second position, the upper surface thereof is generally in the same plane as the product support shelf member upper surface 112.

Each product support shelf assembly support 104 includes an elongated body 120 with a distal end 122 and a proximal end 124. In an exemplary embodiment, each product support shelf assembly support body 120 is generally planar. Each product support shelf assembly support body proximal end 124 includes a temporary coupling second component 76 in the form of a number of hooks 126 structured to be removably coupled to a number of rack assembly slots 96. Further, in an exemplary embodiment, each product support shelf assembly support 104 includes a stationary, first member 130 and a movable, second member 132. The product support shelf assembly support first and second members 130, 132 are movably, and in an exemplary embodiment slidably, coupled to each other. In this configuration, the product support shelf assembly support first member 130 includes the number of hooks 126. Thus, the product support shelf assembly support first member 130 is structured to be, and is, temporarily coupled to a rack 92, 94. Further, the product support shelf member 102 is coupled, directly coupled, or fixed to the product support shelf assembly support second member 132. Thus, in this configuration, the product support shelf member 102 is structured to, and does, move between two positions, a retracted, first position and an extended, second position. In an exemplary embodiment, when in the extended, second position, the product support shelf member 102 has moved between about 4.0 and 12.0 inches, or about 8.0 inches from the retracted, first position.

Further, in an embodiment wherein the product support shelf member 102 is structured to, and does, move between two positions, a retracted, first position and an extended, second position, the reset assembly 60 includes an extending shelf limiting assembly 140 (shown schematically). The extending shelf limiting assembly 140 is structured to, and does, limit the number of product support shelf members 102 that can be in the second position at one time. In an exemplary embodiment, the extending shelf limiting assembly 140 allows only a single product support shelf member 102 to be in the second position at one time. That is, once one product support shelf member 102 begins to move to the second position, the remaining product support shelf members 102 are locked in the first position. In this configuration, the resetting cart 10 is less likely to tip over or become unbalanced. Further, in an exemplary embodiment, the extending shelf limiting assembly 140 is structured to be, and is, actuated when the resetting cart 10 is in motion, i.e., moving from one location to another.

In another exemplary embodiment, the product support shelf assembly supports 104 are structured to, and do, couple the product support shelf member 102 to the mounting assembly 72 at an angle. That is, the product support shelf member 102 is coupled to the mounting assembly 72 with the product support shelf member front side 105 at a lower elevation than the product support shelf member back side 106. In an exemplary embodiment, the angle, relative to horizontal, is between about ten degrees and forty-five degrees, or about twenty-five degrees. In this configuration, gravity will bias product units 2A, 2B, 2C toward the product support shelf member front side 105.

In another exemplary embodiment, the resetting cart 10, or either of the cart assembly 20 or the reset assembly 60, includes a center of gravity assembly 150. The center of gravity assembly 150 is structured to, and does, lower the center of gravity for the resetting cart 10. While the center of gravity assembly 150 is usable with any embodiment of the resetting cart 10, the center of gravity assembly 150 is especially useful in an embodiment wherein one set of product support shelf assemblies 100 extends to one lateral side of the longitudinal frame member 28. In one embodiment, the center of gravity assembly 150 includes a slug 152 disposed as part of, or closely adjacent to, the frame assembly base portion 23. As used herein, a "slug" is a mass intended to, and does, add weight to the resetting cart 10, for example, a twenty-five pound steel weight coupled, directly coupled, or fixed to the frame assembly base portion 23. It is understood that the slug 152 can be any material or any weight. To be a "slug" as used herein, however, the mass cannot be intended to serve another purpose. For example, a wheel locking assembly noted above has a mass and is part of, or closely adjacent to, the frame assembly base portion 23. A wheel locking assembly, however, has the purpose of locking the wheels 24. Thus, as the wheel locking assembly is intended to serve a purpose other than adding weight to the resetting cart 10 it is not a slug 152 or a part of a center of gravity assembly 150.

In another example, the center of gravity assembly 150 includes a number of partially enclosed compartments, hereinafter "bins" 154. In an exemplary embodiment, the bins 154 are disposed adjacent to the frame assembly base portion 23. The bins 154 are used for temporary storage of elements on the resetting cart 10. For example, extra peg members 80, extra product support shelf assemblies 100 or product units 2A, 2B, 2C that are to be discarded are stored in the bins 154. In an exemplary embodiment, the bins 154 are compartments having an open top. In another embodiment, not shown, the bins are wire baskets structured to be coupled to the peg board portion 3. The bins are, in an exemplary embodiment, coupled to the lower half of the peg board portion 3.

In another exemplary embodiment, the reset assembly 60 includes a storage assembly 160. A storage assembly 160 is structured to temporarily couple various elements to the resetting cart 10. The storage assembly 160 includes a number of coupling elements, e.g., hooks for extra product support shelf assemblies 100 (not shown) or utilizes storage assembly bins 162, similar to those described above. Storage assembly bins 162 are not required to be disposed adjacent to the frame assembly base portion 23. In an exemplary embodiment, storage assembly bins 162 include coupling components (not shown) structured to be coupled to the peg board 82. The storage assembly 160 is also structured to act as a counter balance assembly 161. That is, rather than lowering the center of gravity in a manner similar to the center of gravity assembly 150, a counter balance assembly 161 is structured to, and does, move the center of gravity of the reset assembly 60 toward a selected side of the reset assembly 60.

In an exemplary embodiment, the reset assembly 60 also includes a transfer assembly 170. A transfer assembly 170 (shown schematically) is structured to, and does, move product units 2A, 2B, 2C from a product support shelf assembly 100 to an associated shelf member 7A, 7B, 7C. For example, in one embodiment (not shown), a transfer assembly 170 includes a rigid rod that is movably coupled to a product support shelf assembly 100. In a first position, the rod is disposed adjacent to the product support shelf member back side 106 with the product units 2A, 2B, 2C disposed in the front thereof. When the resetting cart 10 is positioned in front of a product display 1, as described below, the bar is moved toward the product support shelf member front side 105, thereby pushing the product units 2A, 2B, 2C onto the shelf members 7A, 7B, 7C. In another embodiment, the transfer assembly 170 includes a drive assembly (not shown) such as, but not limited to, a motor coupled to a screw jack.

In an exemplary embodiment, the reset assembly 60 also includes a vertical position assembly 180 (shown schematically). As noted above, each product support shelf assembly 100 is temporarily coupled to the cart assembly 20 at an elevation corresponding to a shelf member 7A, 7B, 7C. Building product displays 1 may, however, have shelves that are not exactly at desired elevations. That is, the shelf members 7A, 7B, 7C may be slightly higher or lower than a common or specified elevation. The vertical position assembly 180 is structured to, and does, alter the elevation of a number of product support shelf assemblies 100 without having to decouple and recouple the product support shelf assemblies 100 to the cart assembly 20. In an exemplary embodiment, the vertical position assembly 180 includes a screw jack (not shown) disposed between the cart assembly 20 and other portions of the reset assembly 60. When actuated, the screw jack moves substantially all of the reset assemblies 60 vertically relative to the cart assembly 20. Thus, if a product support shelf assembly 100 is at a slightly different elevation relative to an associated shelf member 7A, 7B, 7C, the vertical position assembly 180 is used to alter the elevation of the misaligned product support shelf assembly 100.

In an exemplary embodiment, the reset assembly 60 also includes a number of dividers 190. Each divider includes a generally planar body 192. The dividers 190 are disposed on a product support shelf member upper surface 112 and extend generally front to back. The dividers 190 are structured to, and do, create channels 194 for selected types of product units 2A, 2B, 2C. For example, the dividers 190, in an exemplary embodiment, are spaced by a distance slightly greater than the diameter of soup cans. In this configuration, each channel 194 is structured to hold different types of soup cans. In this configuration, product units 2A, 2B, 2C are less likely to shift laterally on the product support shelf member 102.

In an exemplary embodiment, the reset assembly 60 also includes a garbage assembly 200. The garbage assembly 200 is structured to, and does, support a container for garbage such as, but not limited to, expired product units 2A, 2B, 2C. The garbage assembly 200 includes, in one embodiment, a hook 204 to which a garbage bag 206 is removably coupled.

The elements of the reset assembly 60, as described above, solve the problems stated above.

Figure 5:
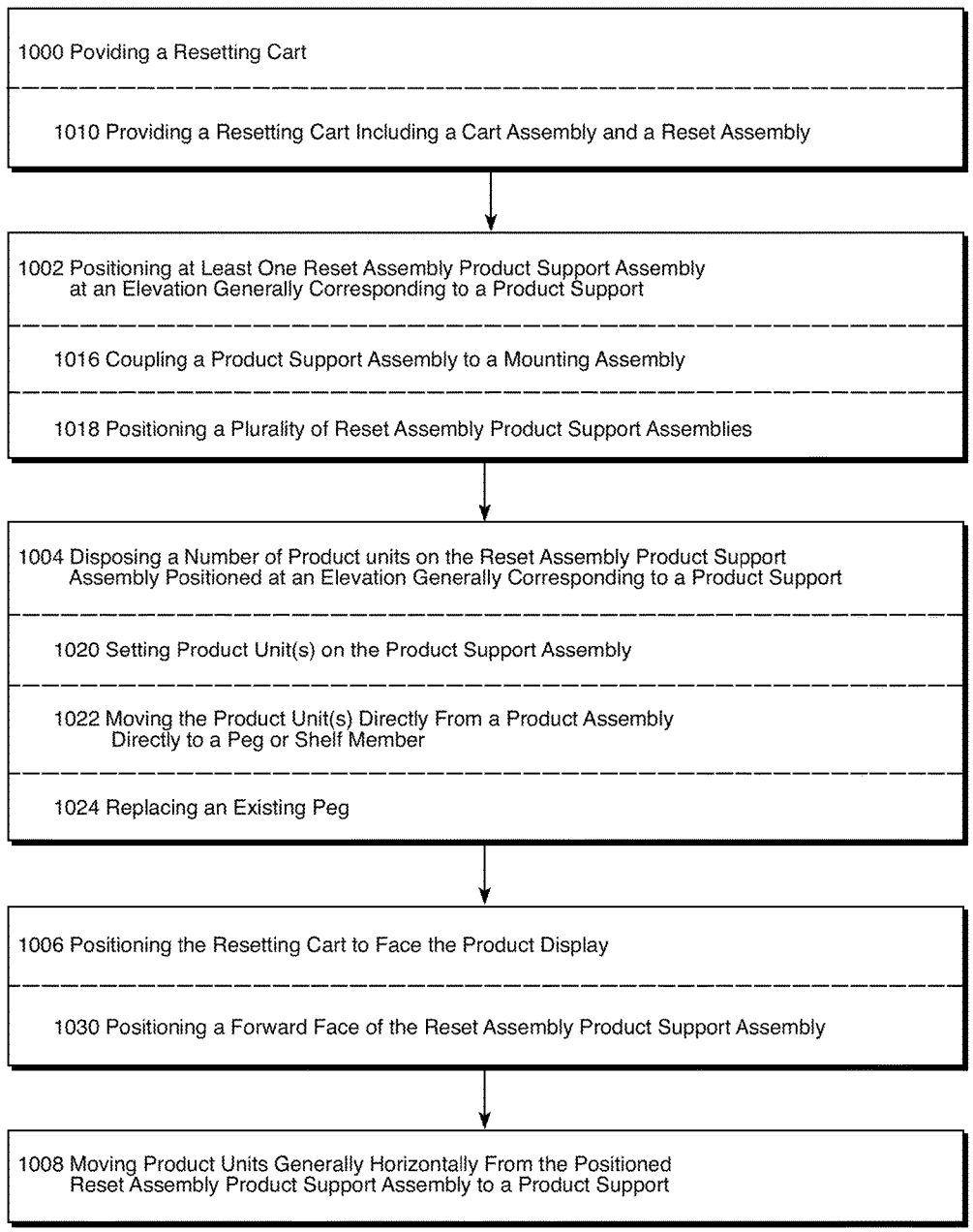
FIG. 5 is a flowchart of the disclosed method.

As shown in FIG. 5, use of the resetting cart 10 described above includes, providing 1000 a resetting cart 10, positioning 1002 at least one product support assembly 70 at an elevation generally corresponding to a product support, disposing 1004 a number of product units on the product support assembly 70 positioned at an elevation generally corresponding to a product support, positioning 1006 the resetting cart to face the product display, and moving 1008 product units generally horizontally from the positioned product support assembly 70 to a product support 5.

That is, providing 1000 a resetting cart 10 includes providing 1010 a resetting cart comprising a cart assembly and a reset assembly, the cart assembly including a frame and a plurality of wheels, the reset assembly including a number of product support assemblies, the reset assembly product support assemblies movably coupled to the cart assembly and structured to move between a number of vertical positions, wherein a number of reset assembly shelf assemblies are disposed at a selected elevation that generally corresponds to a shelf member elevation.

Positioning 1002 at least one product support assembly 70 at an elevation generally corresponding to a product support includes coupling 1016 a product support assembly 70 to a mounting assembly 72 at an elevation generally corresponding to a shelf member 7A, 7B, 7C. The product support assembly 70 at generally the same elevation as a shelf member 7A, 7B, 7C is, as used herein, "associated" with that shelf member 7A, 7B, 7C. Further, in an exemplary embodiment, positioning 1002 at least one product support assembly 70 at an elevation generally corresponding to a product support includes positioning 1018 a plurality of reset assembly product support assemblies, wherein each product support assembly 70 is at a different elevation and generally aligned with an associated product support. As used herein, a product support assembly 70 is "generally aligned" with a shelf member 7A, 7B, 7C when the plane of the product support assembly 70 is generally in the same plane as the plane of the shelf member 7A, 7B, 7C.

Disposing 1004 a number of product units on the product support assembly 70 positioned at an elevation generally corresponding to a product support includes setting 1020 product unit(s) 2A, 2B, 2C on the product support assembly 70. As used herein, "setting" means organizing product unit(s) 2A, 2B, 2C substantially on the resetting cart 10 in a configuration that is substantially similar to the configuration that the product unit(s) 2A, 2B, 2C will be on the pegs 6 or shelf members 7A, 7B, 7C. That is, for example, if expired product unit(s) 2A, 2B. 2C are to be discarded, replacement product unit(s) 2A, 2B, 2C are arranged according to type/brand on the product support assembly 70, e.g., all the walnut brownie boxes of a specific brand are disposed immediately adjacent to each other in a row extending from the product support shelf member front side 105 to the product support shelf member back side 106. In this configuration, product unit(s) 2A, 2B, 2C can be moved 1022 directly from a product support assembly 70 directly to a peg 6 or shelf member 7A, 7B, 7C. Alternatively, an entire peg member 80 having product unit(s) 2A, 2B, 2C thereon is used to replace 1024 an existing peg 6.

Positioning 1006 the resetting cart to face the product display, in an exemplary embodiment, includes positioning 1030 a forward face of the product support assembly 70 between about 0.1 and 10.0 inches from a forward face of the product support 5. Alternatively, the product support assembly 70 abuts, or contacts, the product support 5. To "face," as used herein, means to place, or orient, in opposition to another object. As used herein, the "forward face" (as opposed the verb "face") of the product display 1 is the area immediately adjacent the aisle, i.e., the side defining the distal end of a cantilevered shelf member 7A, 7B, 7C. The "forward face" of the resetting cart 10 is the area including a product support shelf member front side 105. Thus, when the resetting cart 10 faces the product display 1, the product support shelf member front side 105 is disposed adjacent the forward face of an associated shelf member 7A, 7B, 7C. Further, in an embodiment wherein front side barrier member(s) 116A are pivotally coupled to the product support shelf member front side 105, the resetting cart 10 is sufficiently close to the product display 1 that, when the front side barrier member(s) 116A are in the second position, the front side barrier member(s) 116A bridge, i.e., extend across, the gap between the resetting cart 10 and the product display 1.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A resetting cart for resetting product displays, said product displays including a plurality of product supports, each product support disposed at an elevation, said resetting cart comprising:
a cart assembly including a frame assembly and a plurality of wheels;
a reset assembly including a number of product support assemblies;
said reset assembly product support assemblies movably coupled to said cart assembly and structured to move between a number of vertical positions generally corresponding to the elevation of a product support; and
wherein a number of reset assembly product support assemblies structured to support a number of product units and structured to position said product units at an elevation generally corresponding to a product support elevation.

2. The resetting cart of claim 1 wherein:
said reset assembly includes a mounting assembly;
said reset assembly mounting assembly including a number of temporary coupling first components;
each said product support assembly includes a number of temporary coupling second components; and
wherein each said product support assembly is temporarily coupled to said reset assembly mounting assembly.

3. The resetting cart of claim 2 wherein:
said mounting assembly includes a rack assembly;
said reset assembly product support assemblies include a number of movable product support shelf assemblies; and
each said product support shelf assembly coupled to said rack assembly.

4. The resetting cart of claim 3 wherein:
said rack assembly is unitary with said frame assembly;
said rack assembly includes a number of racks,
each rack assembly rack including a first side and a second side;
each rack assembly rack first side including a number of first side first coupling components;
each rack assembly rack second side including a number of second side first coupling components; and
said product support shelf assemblies structured to be in one of a one-sided configuration, a two sided configuration, or a mirrored configuration.

5. The resetting cart of claim 4 wherein each product support is a shelf and wherein each product support shelf assembly is disposed at a selected elevation that generally corresponds to a shelf member elevation.

6. The resetting cart of claim 3 wherein:
each reset assembly shelf assembly includes a planar member and a number of supports;
each said planar member is generally rectangular and is disposed in a generally horizontal plane;

each said generally rectangular planar member including a front side, a back side, a first lateral side, a second lateral side, an upper surface, and a lower surface;
each said shelf assembly support including an elongated body with a distal end and a proximal end;
each said shelf assembly support proximal end including said temporary coupling second component;
one said shelf assembly support coupled to said shelf assembly support member first lateral side; and
one said shelf assembly support coupled to said shelf assembly support member second lateral side.

7. The resetting cart of claim 6 wherein each said reset assembly shelf assembly planar member is movably coupled to said cart assembly and is structured to move between a retracted, first position and an extended, second position.

8. The resetting cart of claim 7 wherein said product display shelf members have a shelf length, and wherein each said reset assembly shelf assembly planar member is one of a shelf length reset assembly shelf assembly planar member or a partial length reset assembly shelf assembly planar member.

9. The resetting cart of claim 2 wherein said product display includes a number of peg members, and wherein:
said reset assembly product support assemblies include a number of product support pegs;
said reset assembly mounting assembly includes a peg board; and
each said product support peg temporarily coupled to said peg board.

10. The resetting cart of claim 2 wherein:
said reset assembly product support assemblies disposed on one side of said mounting assembly;
said reset assembly includes a storage assembly; and
said storage assembly disposed on the opposite side of said mounting assembly relative to said reset assembly product support assemblies.

11. The resetting cart of claim 2 wherein:
said reset assembly includes a center of gravity assembly; and
said center of gravity assembly structured to lower the center of gravity of said reset assembly.

12. The resetting cart of claim 2 wherein:
said reset assembly includes a counter-balance assembly; and
said counter-balance assembly structured to move the center of gravity of said reset assembly toward a selected side of said reset assembly.

13. The resetting cart of claim 2 wherein:
said reset assembly includes a vertical position assembly; and
said vertical position assembly structured to move said reset assembly between a number of vertical positions.

14. A resetting cart for resetting product displays, said product displays including a plurality of product supports, each product support disposed at an elevation, said resetting cart comprising:
a cart assembly including a frame assembly and a plurality of wheels;
a reset assembly including a number of product support assemblies;
said reset assembly product support assemblies movably coupled to said cart assembly and structured to move between a number of vertical positions;
wherein a number of reset assembly product support assemblies are disposed at a selected elevation that generally correspond to a shelf member elevation;
said reset assembly includes a mounting assembly;
said reset assembly mounting assembly including a number of temporary coupling first components;
each said product support assembly includes a number of temporary coupling second components;
wherein each said product support assembly is temporarily coupled to said reset assembly mounting assembly;
said mounting assembly includes a rack assembly;
said reset assembly product support assemblies include a number of movable product support shelf assemblies;
each said product support shelf assembly coupled to said rack assembly;
each product support shelf assembly includes a product retention assembly;
said product retention assembly includes a number of barrier members;
wherein each said barrier member is movably coupled to an associated product support shelf assembly; and
wherein each barrier member is structured to move between a between a lower, first position, wherein the top of each barrier member is at an elevation below the upper surface of the associated product support shelf member and, an upper, second position wherein the barrier member extends above the elevation of the upper surface of the associated product support shelf member.

15. The resetting cart of claim 14 wherein:
said product retention assembly includes a number of capped pin;
each said capped pin extending generally horizontally from an associated product support shelf assembly;
each barrier member is a planar member including a plurality of J-shaped slots;
each said J-shaped slot has a first end at a first elevation, and, a second end at a second elevation, wherein said elevation is higher than said second elevation; and
each capped pin extending through an associated J-shaped slot.

16. The resetting cart of claim 14 wherein:
said product retention assembly front side barrier members are pivotally coupled to said reset assembly shelf assembly planar member front side; and
wherein said product retention assembly front side barrier members move between an upright, first position and a generally horizontal, second position.

17. A method of resetting a product display, said product display including a plurality of product supports, each product support disposed at an elevation, said method comprising:
providing a resetting cart including a cart assembly and a reset assembly, said cart assembly including a frame and a plurality of wheels, said reset assembly including a number of product support assemblies, said reset assembly product support assemblies movably coupled to said cart assembly and structured to move between a number of vertical positions, wherein a number of reset assembly shelf assemblies are disposed at a selected elevation that generally corresponds to a shelf member elevation;
positioning at least one product support assembly at an elevation generally corresponding to a product support;
disposing a number of product units on said product support assembly positioned at an elevation generally corresponding to a product support;
positioning said resetting cart to face said product display; and moving product units generally horizontally from said positioned product support assembly to a product support.

18. The method of claim 17 wherein positioning said resetting cart to face said product display includes positioning a forward face of said product support assembly between about 0.1 and 10.0 inches from a forward face of said product support.

19. The method of claim 17 wherein disposing a number of product units on said product support assembly positioned at an elevation generally corresponding to a product support includes setting said product units.

20. The method of claim 17 wherein positioning at least one product support assembly at an elevation generally corresponding to a product support includes positioning a plurality of reset assembly product support assemblies, wherein each product support assembly is at a different elevation and generally aligned with an associated product support.

* * * * *